May 11, 1937.  P. E. SABINE  2,079,878
SOUND INSULATING STRUCTURE
Filed May 8, 1935
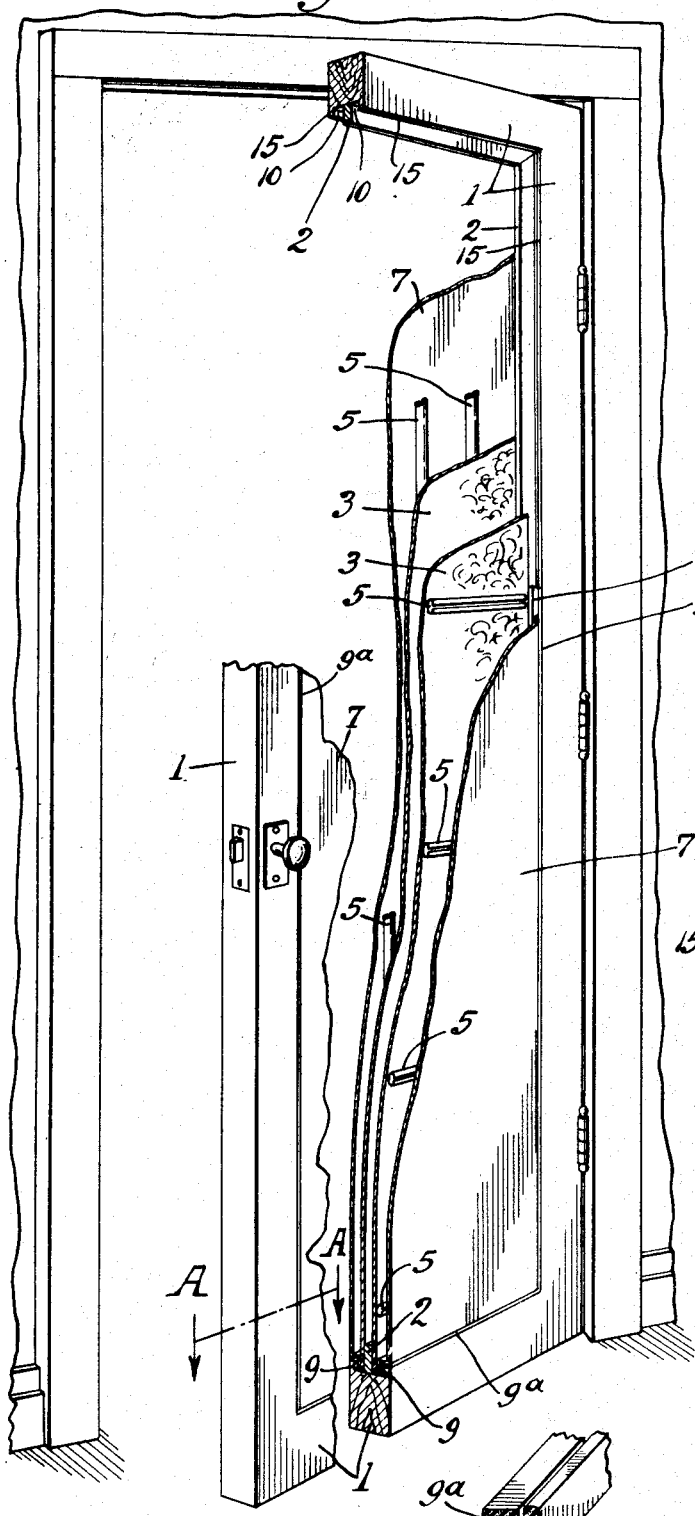
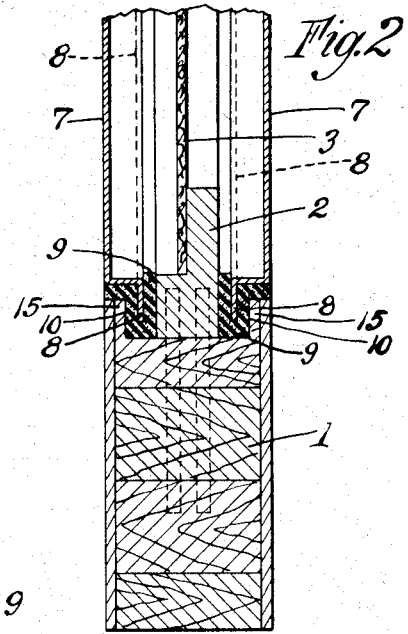
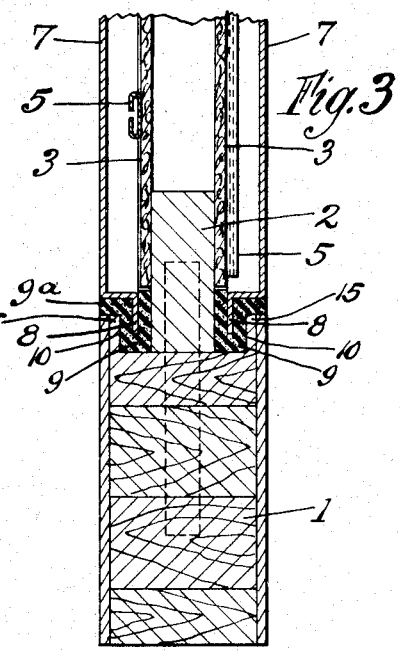
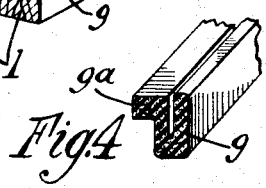
Inventor
Paul E. Sabine
by Parker + Carter
Attorneys.

Patented May 11, 1937

2,079,878

UNITED STATES PATENT OFFICE 2,079,878

SOUND INSULATING STRUCTURE

Paul E. Sabine, Geneva, Ill., assignor of one-half to Riverbank Laboratories, Geneva, Ill., a corporation of Illinois Application May 8, 1935, Serial No. 20,330

9 Claims. (Cl. 20—35)

My invention relates to building construction and has reference more particularly to structures such as doors and hollow partitions, either fixed or movable, in which a high degree of sound insulation between adjacent rooms is desirable without resorting to the thick massive constructions which have hitherto been used to secure this result. It will be understood, however, that my invention is capable of many other applications and its application to door structures should be considered as an example of rather than a limitation of the purposes and advantages of my invention.

Scientific tests have shown that the transmission of sound by way of partitions, walls, doors, and windows results from the forced vibration of such structures under the alternating pressure thereon generated by the incidence of sound waves. This forced vibration of the structure, either as a whole or in segments, generates sound waves on the further side of such structure. Tests further show that the amplitude of such forced vibrations is decreased by increasing the mass of the structure and to a less degree by increasing the flexural stiffness. Theoretical considerations show that the sound insulating properties of a structure are also increased by increasing the internal mechanical damping therein. To accomplish this end doors and hollow partitions have hitherto been constructed in which various types of fibrous material such as hair felt, vegetable and mineral fibers have been incorporated. Such means have proven relatively ineffective, inasmuch as the fibrous materials furnish a measure of solid contact between the faces of the hollow construction, thus increasing the transmission of vibratory motion between the outer faces and thus largely nullifying any virtue which such fibrous material possess as damping agents. Another means has been to incorporate sheets of lead or steel inside the hollow construction. Tests have shown that the effectiveness of sheets so used is due largely to the increased weight which they give to the structure as a whole, with the result that increased insulating power is secured at the expense of greatly increased weight. Clearly in many circumstances this increase of weight is, as a practical factor, highly disadvantageous.

Another means that has hitherto been employed consists of an inner framework with outer panels which panels are separated from each other and yieldingly connected to the inner framework by means of spring clips of steel or other metal so as to absorb the vibration of said panels. Such means do not however provide for the damping of the vibrations of these panels and do not prevent the passage of sound through the cracks between the inner frame and said panels without making the contact therebetween so close and intimate as largely to neutralize the resilient action of the spring clips.

One object of my invention is to provide a hollow door or wall construction comprising flush panels carried in an outer supporting frame of either wood or metal or any other suitable material, by strips of resilient damping material, in such a manner as both to damp the vibration of said panels and effectively to seal the cracks between said panel and said supporting frame, the whole constituting a construction which can be cheaply and easily fabricated.

Another object of my invention is to provide a light, cheap inner construction for hollow doors or partitions, which inner construction by virtue of its mechanical properties is capable of damping out a very large part of the vibratory energy imparted by sound waves to the structure and thus of rendering the structure as a whole much more sound insulating than structures of equal weight that have hitherto been devised.

Another object of my invention is to build a hollow door or partition in which thin laminae of air are enclosed, said laminae of air being completely separated from each other by sheets of light, impervious material with high mechanical damping, whereby vibrations set up by the action of sound waves on one face of the door or partition are diminished by said damping member and the intervening air spaces.

A further object of my invention is to provide means whereby the effectiveness of the said sheets of light impervious material in reducing the transmission of sound is further increased without materially increasing the weight of the structure as a whole, by attaching in a manner hereinafter disclosed, light stiffening ribs thereto.

Reference is made to the accompanying drawing forming a part of this specification and representing a specific application of my invention to the construction of a sound insulating door. The drawing will be considered also as a typical showing of an application of my invention but not as a limitation of my invention to the specific structure shown which may be treated, as in a broad sense illustrative.

Figure 1 is a perspective of such a door with parts broken away to show the details of construction;

Figure 2 is a section through the door on the line A—A, showing a single sheet of damping material interposed, thus providing two enclosed air spaces;

Figure 3 is a similar section, but with two sheets of damping material interposed and forming three enclosed air spaces; and Figure 4 represents one form of the damped resilient channels which carry the surface panels.

Other forms which serve the same purpose may be employed and still come within the scope of my invention.

Like parts are indicated by like symbols throughout the specification and drawing.

Referring to the drawing, the frame 1 may be of wood or other suitable material, fabricated so as to form a rigid empty frame. 2 is a preferably lighter inner frame, glued or otherwise secured within the frame 1. This inner frame serves as a means of attachment for the edges of the sheets 3.

Sheets 3 are of non-rigid flexible non-porous heavily damped material. Sheets of asbestos, coated with asphaltum, or of heavy roofing paper, may be used for the purpose. Experiments have shown that for the most successful operation the sheets should be cemented substantially air tight at their edges to the frame 2. Stiffening ribs 5 of thin sheet metal with the edges crimped or bent over to form channels of light structure are cemented or otherwise intimately secured to the sheets 3, in such a manner as to prevent the segmental vibrations of said sheets. As will be clear for example from Figure 1, these stiffening ribs 5 may be disposed in various directions. In Figure 1 I illustrate them as applied both horizontally and vertically. Any other suitable angle or disposition may be employed.

The panels 7 may be shallow metal pans or may be fabricated of metal channels and sheets of thin veneer or compressed fiber board. A narrow flange 8 projects from the periphery of 7. 9 is a channel of sponge rubber or other damped resilient material which is carried in the slot 10, which is routed into the outer frame 1. It lies within the extension 15 of the frame 1. The channel 9 is carried into the joint between the panel 7 and the outer frame 1, and serves a double purpose. It effectively seals the joint between 1 and 7 and by friction damps any movement of the panel 7 relative to the frame 1. The combined action of the damped resilient member 9 and its outward extension 9a may be roughly compared to the springs and the snubber of an automobile. The portion 9 allows the movement of 7 independently of 1, corresponding to the spring action. 9a serves to reduce the motion of 7 by frictional damping corresponding to the snubber action.

While I have described in detail one method of combining the various elements of my invention in the assembly of a sound insulating door, it will be recognized that there are other ways in which the essential elements thereof may be combined to secured the same desired result. The particular form shown admits of easy fabrication along the lines usually employed in the manufacture of doors. Another means is to assemble separately the outer framework 1, and the inner framework 2 with the sheets 3 attached hereto, and the panels 7 resiliently mounted thereon. The inner and outer elements are then combined by means of dowels set in resilient bushings in the two elements.

Laboratory tests conducted on the construction hereinbefore described show that it is much more effective than other types of construction of equal weight in reducing the passage of sound between rooms. The following results of measurement on various partitions are presented in verification of this statement.

| Material | Thickness | Wt./sq. ft. | Reduction in decibels |
| --- | --- | --- | --- |
|  | Inches |  |  |
| Steel | ½ | 10.1 | 35 |
| Oak (Solid) | 1¾ | 6.7 | 25 |
| Solid masonry | 2 | 10.4 | 26 |
| Solid masonry | 5 | 27 | 40 |
| Door as specified | 2½ | 7.5 | 40 |

I have described the inner structure, consisting of the highly damped sheets 3, with the stiffening ribs 5, as a part of a door. It is evident that essentially the same construction can be used in increasing the sound insulation of any hollow partition structure such as office partitions of steel or composition board, fabricated in units to permit of easy setting up and removal. The structure shown is further applicable to the construction of theater curtains or sliding partitions where it is desirable to secure a high degree of sound insulation in light and easily movable structures. A further application is to the sound insulation of airplane cabinets, wherein an increase of sound insulation without an excessive increase in weight is highly desirable.

It will be realized that where space within a hollow partition is not limited by the structural necessities imposed upon doors and thin partitions, a high degree of sound insulation can be secured by the use of a number of units of the type described.

It will appear that my invention includes the use of means for applying to hollow partitions, such as doors, walls, and the like, surface members or panels in such a manner that said members are free to move independently of their supporting framework without allowing any cracks or opening to arise between said members and the supporting framework. Also, frictional damping is applied to the motion of said panels, and means are provided within such hollow partitions, thin lamellar air spaces, said air spaces being effectively sealed and separated from each other by thin sheets of highly damped material, said sheets being if necessary, reinforced by light ribs in such a manner as to reduce the transmission of vibrational energy between the faces of said hollow partitions.

It will be realized that whereas I have described and shown a practical and operative embodiment of my invention nevertheless many changes may be made in size, shape, number, disposition and material of parts and I therefore wish my drawing and description to be taken as in a broad sense illustrative and diagrammatic rather than as limiting me to the details of the structure shown or to the application of my invention herein described and shown.

I claim:

1. In a sound insulating structure, the combination of a circumferential supporting framework, an interior lighter framework secured thereto, one or more sheets of light, impervious, highly damped material attached and cemented at their edges to said interior framework so as to enclose lamellar air spaces within said sound insulating structure, resilient damping material carried in grooves in said supporting framework, and outer facing panels having peripheral portions mounted in channels in said resilient material, said damping material being so shaped as to close completely the joint between the supporting framework and the outer panel, whereby to damp any motion of the facing panel relative to the supporting framework.

2. In a sound insulating structure, the combination of a circumferential supporting framework, one or more sheets of light, impervious, highly damped material attached and cemented at their edges to said framework so as to enclose lamellar air spaces within said sound insulating structure, resilient damping material carried in grooves in said supporting framework, and outer facing panels having peripheral portions mounted in channels in said resilient material, said damping material being so shaped as to close completely the joint between the supporting framework and the facing panel, whereby to damp any motion of the facing panel relative to the supporting framework.

3. In a sound insulating structure, the combination of a circumferential supporting framework, one or more sheets of light, impervious, highly damped material attached and cemented at their edges to said framework so as to enclose lamellar air spaces within said sound insulating structure, resilient damping material mounted on said supporting framework, and outer facing panels having peripheral portions mounted in channels in said resilient material, said material being so shaped as to close completely the joint between the supporting framework and the outer panel, whereby to damp any motion of the outer facing panel relative to the supporting framework.

4. In a sound insulating structure, an outer frame, an inner and lighter frame of less thickness than the outer frame, one or more non-rigid, flexible, non-porous, heavily damped sheets sealed at their edges to said inner frame, reinforcing members secured to the faces of said sheets and adapted to prevent segmental vibration thereof, outer facing panels for said structure, resilient material mounted upon said frame, said resilient material being provided with channels, the peripheral portions of said outer facing panels extending into said channels, said resilient material being so shaped as to close completely the joint between the supporting framework and said outer panels.

5. In a sound insulating structure, a peripheral frame having an inner portion of less thickness than its outer portion, one or more non-rigid, flexible, non-porous, heavily damped sheets sealed at their edges to said inner portion, reinforcing members secured to the faces of said sheets and adapted to prevent segmental vibration thereof, outer facing panels for said structure, resilient material mounted upon said frame, said resilient material being provided with channels, the peripheral portions of said outer facing panels penetrating said channels, said resilient material being so shaped as to close completely the joint between the supporting framework and said outer panels.

6. In a sound insulating structure, in combination, a peripheral internally grooved supporting frame work, resilient damping material carried in said grooves, and provided with longitudinal channels, and one or more peripherally flanged panels, the flanges of said panels being carried in the longitudinal channels of the resilient damping material, said material being adapted both to seal the joint between the supporting framework and the panel and to damp the vibration of said panels relative to the supporting framework.

7. In a sound insulating structure, in combination, a peripheral supporting framework having a central aperture, resilient damping material carried in and surrounding said aperture and provided with a circumferential channel, a panel having flanges carried in said channel of the resilient damping material, said material being adapted both to seal the joint between the supporting framework and the panel, and to damp the vibration of said panel relative to the supporting framework, said panel and the supporting framework being joined together only by said seal of resilient damping material.

8. In a sound insulating structure, in combination, a peripheral internally recessed supporting framework resilient damping material carried in said recess, and provided with a circumferential channel, a panel having flanges carried in said channel of resilient damping material, said material being adapted both to seal the joint between the supporting framework and the panel and to damp the vibration of said panel relative to the supporting framework, said panel and the supporting framework being joined together only by said seal of resilient damping material.

9. The structure recited in claim 7 characterized by the employment of a panel having flanges inset from the plane of the exposed face of the panel whereby said face lies in the general plane of the exposed face of the supporting framework.

PAUL E. SABINE.